United States Patent
Miller et al.

(10) Patent No.: US 9,973,016 B2
(45) Date of Patent: May 15, 2018

(54) PORTABLE POWER CHARGER WITH TWO-WAY CHARGING INTERFACE

(71) Applicants: Garold C. Miller, Glastonbury, CT (US); Nathan Daniel Weinstein, Glastonbury, CT (US)

(72) Inventors: Garold C. Miller, Glastonbury, CT (US); Nathan Daniel Weinstein, Glastonbury, CT (US)

(73) Assignee: Halo2Cloud, LLC, Hartford, CT (US)

( * ) Notice: Subject to any disclaimer, the term of this patent is extended or adjusted under 35 U.S.C. 154(b) by 1267 days.

(21) Appl. No.: 13/682,985

(22) Filed: Nov. 21, 2012

(65) Prior Publication Data

US 2013/0076298 A1 Mar. 28, 2013

Related U.S. Application Data

(63) Continuation-in-part of application No. 13/571,992, filed on Aug. 10, 2012, now abandoned.
(Continued)

(51) Int. Cl.
*H02J 7/00* (2006.01)
*F21L 4/08* (2006.01)
*F21V 23/04* (2006.01)

(52) U.S. Cl.
CPC .............. *H02J 7/0068* (2013.01); *F21L 4/08* (2013.01); *F21L 4/085* (2013.01);
(Continued)

(58) Field of Classification Search
CPC ...... H02J 7/0027; H02J 7/0055; H02J 7/0054; H02J 7/0047; H02J 7/0068; H02J 2007/006; H02J 2007/005; H02J 2007/0062
(Continued)

(56) References Cited

U.S. PATENT DOCUMENTS

| D416,233 S | 11/1999 | Tsai |
| 6,528,970 B1 | 3/2003 | Liu et al. |

(Continued)

FOREIGN PATENT DOCUMENTS

| JP | 2009065769 A | 3/2009 |
| JP | 2010104155 A | 5/2010 |

(Continued)

OTHER PUBLICATIONS

Cheap 2500mAh Mobile External Power Battery Charger for iPho . . . , http://www/everbuying.com/product172197.html, entitled "2500mAh Mobile External Power Battery Charger for iPhone 4/4S, Various Mobile Phones and Digital Devices", dated Dec. 28, 2012, pp. 1 through 7.
(Continued)

*Primary Examiner* — Richard Isla Rodas
*Assistant Examiner* — Manuel Hernandez
(74) *Attorney, Agent, or Firm* — McCormick, Paulding & Huber LLP

(57) ABSTRACT

A portable power charger having an internal rechargeable battery is provided with a power connection port than can act in a power input mode when the charger is connected with an external power source via the power connection port and in a power output mode when at least one electronic device is connected to the charger via the power connection port. The power charger may be connected with both an external power source and an electronic device via the power connection port at the same time, wherein the charge supplied from the external power source recharges the charger and any electronic device connected to the charger. The charger also can automatically turn on if a connector cable is connected to the power connection port with either an external power supply or an electronic device connected at
(Continued)

the other end of the cable to supply or draw power through the cable.

6 Claims, 5 Drawing Sheets

Related U.S. Application Data

(60) Provisional application No. 61/521,815, filed on Aug. 10, 2011.

(52) U.S. Cl.
CPC ........ *F21V 23/0414* (2013.01); *H02J 7/0027* (2013.01); *H02J 7/0044* (2013.01); *H02J 7/0047* (2013.01); *H02J 7/0054* (2013.01); *H02J 7/0055* (2013.01); *H02J 7/0013* (2013.01); *H02J 2007/005* (2013.01); *H02J 2007/006* (2013.01); *H02J 2007/0062* (2013.01)

(58) Field of Classification Search
USPC ......................................... 320/103
See application file for complete search history.

(56) References Cited

U.S. PATENT DOCUMENTS

| | | | |
|---|---|---|---|
| 6,612,875 B1 | 9/2003 | Liao | |
| 6,820,206 B1* | 11/2004 | Kim et al. | 713/300 |
| 6,828,754 B2* | 12/2004 | Yang | 320/103 |
| 6,894,457 B2 | 5/2005 | Germagian et al. | |
| 7,011,538 B2 | 3/2006 | Chang | |
| 7,030,517 B2 | 4/2006 | Hansmann et al. | |
| 7,273,384 B1 | 9/2007 | So | |
| D554,585 S | 11/2007 | Nazar | |
| D574,833 S | 8/2008 | Hussaini et al. | |
| D585,825 S | 2/2009 | Ji | |
| D594,817 S | 6/2009 | Abdallah et al. | |
| 7,766,698 B1* | 8/2010 | De Iuliis et al. | 439/638 |
| D628,535 S | 12/2010 | Cheng | |
| D636,337 S | 4/2011 | Smith et al. | |
| RE42,385 E * | 5/2011 | Wong | G06F 1/1632 320/111 |
| 8,109,792 B2 | 2/2012 | Briano et al. | |
| 8,547,056 B2 | 10/2013 | Chang | |
| 9,385,549 B2* | 7/2016 | Miller | H02J 7/0042 |
| 9,812,878 B1* | 11/2017 | Stieber | H02J 7/0021 |
| 2003/0030412 A1* | 2/2003 | Matsuda et al. | 320/127 |
| 2004/0085694 A1 | 5/2004 | Germagian et al. | |
| 2005/0009404 A1 | 1/2005 | Lee | |
| 2005/0170699 A1* | 8/2005 | Overtoom | 439/639 |
| 2007/0182365 A1* | 8/2007 | Yang | 320/107 |
| 2008/0238356 A1 | 10/2008 | Batson et al. | |
| 2009/0267562 A1* | 10/2009 | Guccione et al. | 320/114 |
| 2010/0109602 A1* | 5/2010 | Chang | 320/103 |
| 2012/0187902 A1 | 7/2012 | Wang | |
| 2012/0238132 A1 | 9/2012 | McSweyn | |
| 2013/0093242 A1* | 4/2013 | Mok | H02J 9/005 307/23 |
| 2014/0152257 A1 | 6/2014 | Miller et al. | |
| 2014/0299372 A1* | 10/2014 | Meazell | G06F 1/263 174/74 R |
| 2015/0280478 A1* | 10/2015 | Nonogaki | H02J 7/0054 320/103 |
| 2015/0303727 A1* | 10/2015 | Jeong | H02J 7/0044 320/103 |
| 2017/0192474 A1* | 7/2017 | Robinson | G06F 1/263 |
| 2017/0194806 A1* | 7/2017 | Inskeep | H02J 7/0068 |

FOREIGN PATENT DOCUMENTS

| | | |
|---|---|---|
| KR | 1020060084309 | 7/2006 |
| KR | 1020070101084 B1 | 9/2007 |

OTHER PUBLICATIONS

Amazon.com: Anker® Astro Mini 2600mAh—Ultra-Compant Li . . . , http://www.amazon.com/gp/product/Boo5X1Y7I2/ref=oh_details . . . , dated Dec. 28, 2012, pp. 1 through 6.

Cheap 2600mAh Aluminum Tubes Cylindrical Mobile Power for . . . , http://www/everbuying.com/product170.html, entitled "2600mAh Aluminum Tubes Cylindrical Mobile Power for iPhone 4/4S, Various Cell Phones and Digital Devices (Rose)", dated Dec. 28, 2012, pp. 1 through 7.

International Search Report for PCT/US2013/071296 dated Mar. 17, 2014.

International Search Report for PCT/US2013/054498 dated Dec. 17, 2013.

* cited by examiner

PORTABLE POWER CHARGER WITH TWO-WAY CHARGING INTERFACE

CROSS-REFERENCE TO RELATED APPLICATION

This application claims the benefit of U.S. patent application Ser. No. 13/571,992, filed Aug. 10, 2012, and U.S. Provisional Application No. 61/521,815, filed Aug. 10, 2011, which are incorporated herein by reference.

FIELD OF INVENTION

The present invention generally relates to power chargers for electronic devices, and more particularly relates to a portable charger having a two-way charging interface capable of operating in a power input mode and a power output mode.

BACKGROUND OF THE INVENTION

Present day consumers typically own several electronic devices specifically designed for portability and use on-the-go, including, for example, a mobile phone or smart phone, a portable music player like an iPod® or an MP3 player, a tablet, a portable gaming unit, and the like. Each of these devices requires frequent recharging. Such electronic devices typically utilize a cable for connecting the device to a power source, such as a wall outlet, a car charger, an airplane charger, or a computer. However, a separate cable is usually required for each power source. Moreover, different electronic devices often utilize different connection ports and interfaces such that a single charging cable is not compatible with multiple devices. Accordingly, a tech-savvy consumer, with several electronic devices, will usually have multiple charging cables to keep track of. Even then, the consumer may be without sufficient power to recharge a phone due to bad weather or a power outage, or may not always be in a place where a power source is readily available, or even if so, may not have the appropriate cable or adapter available to use with a particular power source.

With traditional power sources, such as those noted above, it is difficult to charge multiple devices at the same time, especially where each device requires a separate charging cable. For example, a car charger port will only handle a single cable at a time. Adaptor devices are available on the market for connecting multiple devices to a power source at the same time—for example, a two-to-one or three-to-one car charger splitter. However, such adapters are often only compatible with certain interfaces. Moreover, such adapters are separate from portable power sources and tend to be bulky.

Similarly, interface attachments are also available for adapting a charging cable for use with a variety of devices for recharging from a power source, each with a different interface. However, such attachments are usually separate pieces, and therefore difficult to keep track of when not in use. Further, use of such attachments does not solve the problem presented by the need to charge multiple devices at the same time, from the same power source, as oftentimes, only one attachment can be used with a charging cable at a time.

Existing power charger devices also usually cannot charge multiple devices at the same time. Even if multiple devices may be attached to the power charger at the same time, the charger will prioritize how the devices are recharged—i.e., it will charge one device first and then the second, and so on. However, this approach takes a long time to recharge all devices and risks not having sufficient charge remaining in the charger for fully charging the second device.

Further, some portable charger devices will not permit recharging from the charger when the charger is itself being recharged or connected to an external power source. Such devices require the charger unit to be disconnected from a power source before a charge will be passed on to a device connected to the charger, or require the charger unit to be fully charged first before any device connected to the charger unit can be recharged.

Additionally, such portable charger devices typically require a dedicated input port for recharging the internal battery and a separate output port dedicated for recharging electrical devices from the internal battery. More particularly, such charging devices often require multiple output ports for recharging multiple electronic devices at the same time. The addition of extra charging ports compromises the size and design of the charger unit, for example, a unit with a dedicated input port and two or more output ports would need to be larger than a charger unit with just a single port due to the need to properly arrange the electronics for operation of the charger as desired.

In view of the foregoing, there is a need for a charger that can be used to charge a variety of electronic devices, including but not limited to smart phones, mobile phones, data tablets, music players, cameras, camcorders, gaming units, e-books, Bluetooth® headsets and earpieces, GPS devices, and the like, either individually or collectively in various combinations. Additionally, there is a need for such a charger that is portable, has a compact size, and is easy to use in various conditions and locations to charge one or more electronic devices simultaneously, including but not limited to in a house or office, a car or an airplane. Still further, there is a need for a portable charger having a port that can act both as an input port for recharging an internal battery unit in the charger and as an output port for recharging an electronic device connected to the charger. Still further, there is a need for a portable charger that can recharge the internal battery from an external power source at the same time as an electronic device connected to the charger, even while both the external power source and the electronic device are connected to the charger through the same port. Accordingly, it is a general object of the present invention to provide a portable charger that improves upon conventional power chargers currently on the market and that overcomes the problems and drawbacks associated with such prior art chargers.

SUMMARY OF THE INVENTION

In accordance with the present invention, a portable charger is provided for charging one or more electronic devices. In general, a portable charger kit may comprise a portable charger unit having an internal rechargeable battery unit for connecting to and recharging one or more electronic device, as necessary, and a connector cable for connecting the power charger unit with an external power source, or at least one electronic device, or both.

In a first aspect of the present invention, the charger unit comprises a charger housing with a power connection port which can operate as a two-way charging interface. A rechargeable battery unit is disposed within the charger housing and is operatively connected with the power connection port, which may act as a power input (for providing an electrical charge from an external power source for recharging the internal battery unit when the charger unit is connected to the external power source), and which may act as a power output (for charging the internal batteries of other electronic devices from the rechargeable battery unit). The charger further includes a controller or processing unit that determines which operational mode the power connection port is in based on what is connected to the port.

The charger unit is portable as a result of the small size of the housing. Despite the small size of the unit, the power capacity is very high so that the charger can accommodate multiple electronic devices at the same time via the common power connection port. Similarly, the charger can utilize the common power connection port to connect the internal battery unit to an external power source for recharging while simultaneously connecting the charger to one or more electronic devices for recharging via the power connection port.

In preferred embodiments of the present invention, the charger unit automatically turns on when it is connected with an electronic device needing charging. More particularly, the charger unit detects the presence of a connector cable in connection with the power connection port, as well as the presence of an electronic device on the other end of the connector cable to draw power from the charger unit via the connector cable. Such technology utilizes an internal switch disposed within the charger housing and operatively connected to the rechargeable battery unit that actuates to an "on" position when the appropriate conditions are met.

In various embodiments of the present invention, the charger unit may further comprise a controller and internal logic, which can sense the connection of one or more electronic devices with the charger via the power connection port, determine if the charger is connected to an external power source via the power connection port, and coordinate operation of the power connection port as either a power input or a power output, or both. In preferred embodiments, the power connection port can be used as a conduit for charging the internal battery unit from an external power source and as a conduit for charging electronic devices from the charger, often at the same time.

In an embodiment of the charger unit of the present invention, a connector cable, having multiple connection interfaces, is attached to the charger housing via the power connection port of the charger unit. Preferably, the connector cable includes a power interface for connecting the cable with the two-way power connection interface of the charger, one interface for connection with an external power source for directly recharging the internal rechargeable battery unit in the charger, and at least one interface for connection with an electronic device for recharging from the internal battery unit or directly from the external power source when the connector cable is connected to the electronic device, the portable charger and the external power source at the same time.

In another aspect of the present invention, a squid connector cable is provided for facilitating connection of one or more electronic devices to the portable charger unit or another power source. In a preferred embodiment, the squid connector comprises a USB connector adapted to engage the power connection port of the portable charger unit or any other device with a USB port; a connection interface for connection of the cable with an external power source, for example, a traditional plug interface for connection with a wall socket, a car charger interface for connection with a car charger socket, an airplane charger interface for connection with an airplane charger socket, and a standard USB interface for connection with a USB port on a power source such as a computer; and multiple connector interfaces adaptable for connection with various electronic devices. The power supply connection interfaces can be interchangeable.

An advantage of providing multiple connector interfaces on a common connector cable is that several electronic devices can be charged at the same time. Additionally, the portable charger unit can be connected to an external power source and several electronic devices at the same time, both for charging the electronic devices and recharging the internal battery unit of the portable charger. Moreover, multiple connector interfaces can be designed to attach to and accommodate various types of devices, including smart phones, mobile phones, data tablets, music players, cameras, camcorders, gaming units, e-books, Bluetooth® headsets, GPS devices, and the like. The connector interfaces can be interchangeable.

The present invention is also directed to a method for using a portable power charger having a rechargeable internal battery that is operatively connected to a power connection port capable of operating in a power input mode and a power output mode. In accordance with an embodiment of the method, the power charger is connected to a first end of a connector cable via the power connection port of the power charger. The power charger is placed in the power input mode if a second end of the connector cable is connected to an external power source, whereby an electrical charge is provided to the internal battery of the power charger from the external power source to recharge the internal battery. The power charger is placed in the power output mode if the second end of the connector cable is connected to at least one electronic device having an internal battery, whereby an electrical charge is provided from the internal battery of the power charger to recharge the internal battery of the at least one electronic device.

In accordance with another embodiment of the method, the power charger includes a rechargeable internal battery and a processing unit each connected to a power connection port. The processing unit determines if a connector cable is connected to the power connection port, and if so, also determines if the connector cable is connected to at least one of (i) an external power source supplying an electrical charge through the connector cable, and (ii) an electronic device attempting to draw an electrical charge through the connector cable. If both conditions are met, the power charger is turned on. In another aspect of the method, the power charger is shut off if the internal battery of the power charger is fully charged and if the internal battery of any electronic device connected to the power charger via the connector cable is fully charged.

These and other objects, features and advantages of the present invention will become apparent in light of the detailed description of embodiments thereof, as illustrated in the accompanying drawings.

DETAILED DESCRIPTION OF THE DRAWINGS

Figure 1:
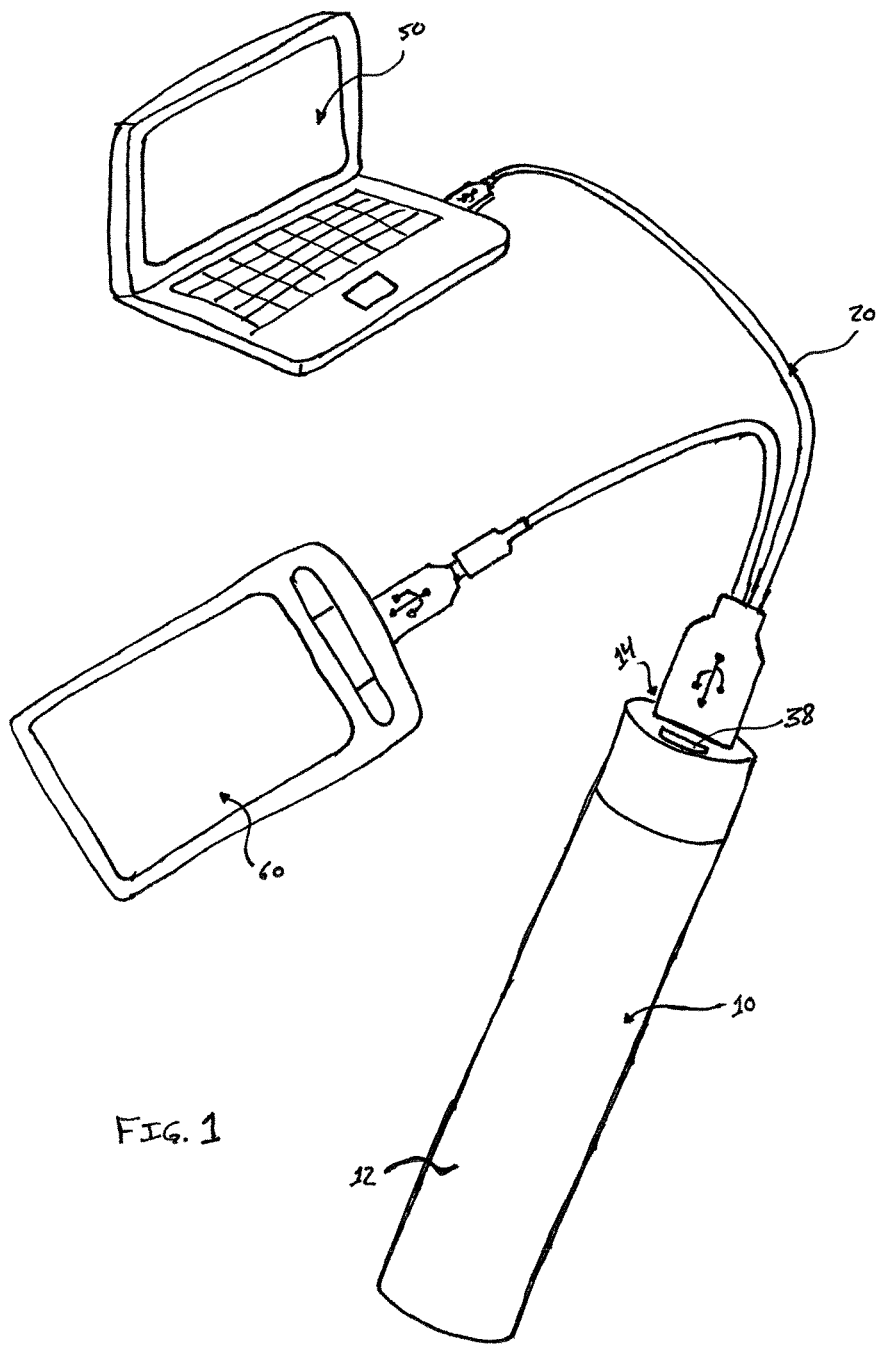
FIG. 1 shows a portable charger kit in accordance with the present invention, including a portable charger unit and a connector cable for connecting the charger unit with an external power source and at least one electronic device at the same time.
Figure 2:
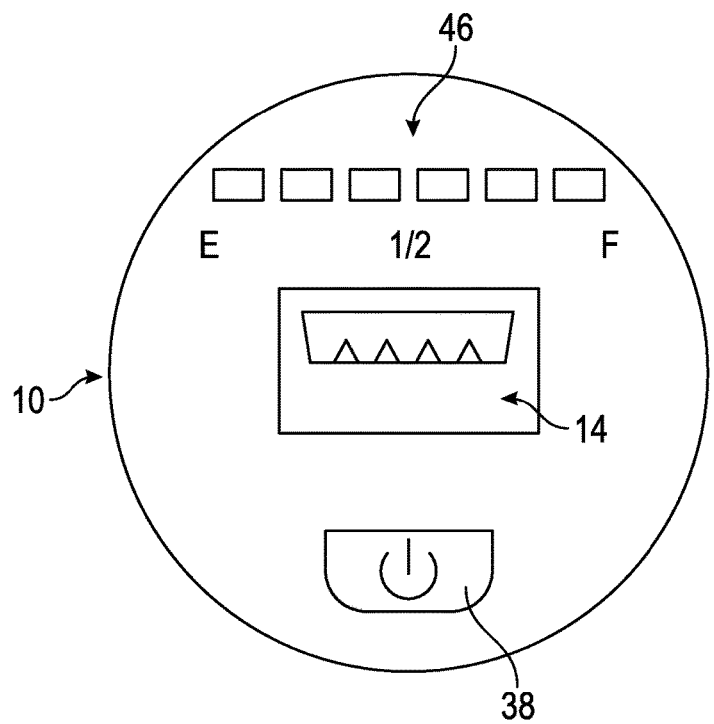
FIG. 2 shows a planar end view of an embodiment of the portable charger unit of FIG. 1.

A portable charger kit in accordance with the present invention is shown in FIGS. 1-2, and generally comprises a portable charger unit 10 having a rechargeable internal battery for recharging one or more electronic devices. The portable charger unit 10 may have a variety of designs, including the embodiments discussed and illustrated herein, and may be provided with connector cables, connection interfaces and adapters suitable for recharging the internal battery of the charger unit 10 and recharging the batteries of various electronic devices connected thereto. For example, as shown in FIG. 1, the portable charger kit includes the portable charger unit 10 and a connector cable 20 having multiple connection interfaces for connecting the charger unit 10 with an external power source (e.g., computer 50) and one or more electronic devices (e.g., smart phone 60), as necessary. Additional designs for the portable charger unit 10 are illustrated and described in co-pending U.S. patent application Ser. No. 13/571,992, filed Aug. 10, 2012, which shares common inventors with the present application and which is incorporated herein by reference. Such designs shown in that application can be provided with the features described herein.

Figure 3:
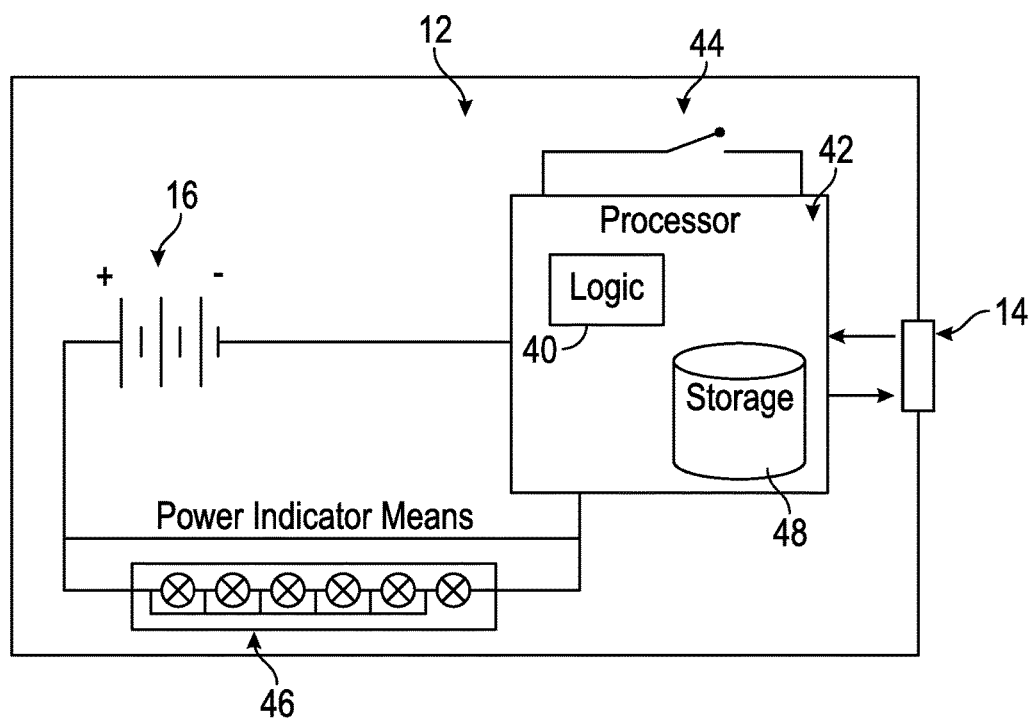
FIG. 3 illustrates a schematic view of internal components of the charger unit of FIG. 1.

Referring to FIGS. 1-2, the portable charger unit 10 comprises a charger housing 12 with a power connection port 14. As shown in FIG. 2, the power connection port 14 generally takes the form of a USB port, but can take the form of any known interface for connecting a device with a power source, including but not limited to a mini-USB interface, a micro-USB interface, or an AC-to-DC connector interface. Referring to FIG. 3, the power connection port 14 is in operative communication with an internal rechargeable battery unit 16 disposed within the charger housing 12.

In accordance with intended operation of the portable charger kit, a user has the option of recharging one or more electronic devices from a standard power source, such as a computer, a wall socket, a car power outlet, or an airplane power outlet, or using the charger unit 10 when a standard power source is not readily available. For example, the kit of the present invention can be used to charge smart phones, mobile phones, data tablets, music players, cameras, camcorders, gaming units, e-books, Bluetooth® headsets and earpieces, GPS devices, and the like, either individually or collectively in various combinations when the user is away from a standard power source. To do so, an electronic device 60 can be connected to the charger unit 10 using the connector cable 20. As shown in FIG. 1, the connector cable 20 is connected at a first end 22 to the power connection port 14 of the charger unit 10. A free second end 26 of the connector cable 20 can be connected with the electronic device 60. When the connector cable 20 is connected in this manner, the electronic device 60 can be recharged from the rechargeable battery unit 16 of the charger unit 10, which is helpful in situations where a standard power source is not readily available or if power is lost due to weather or an outage.

Figure 4:
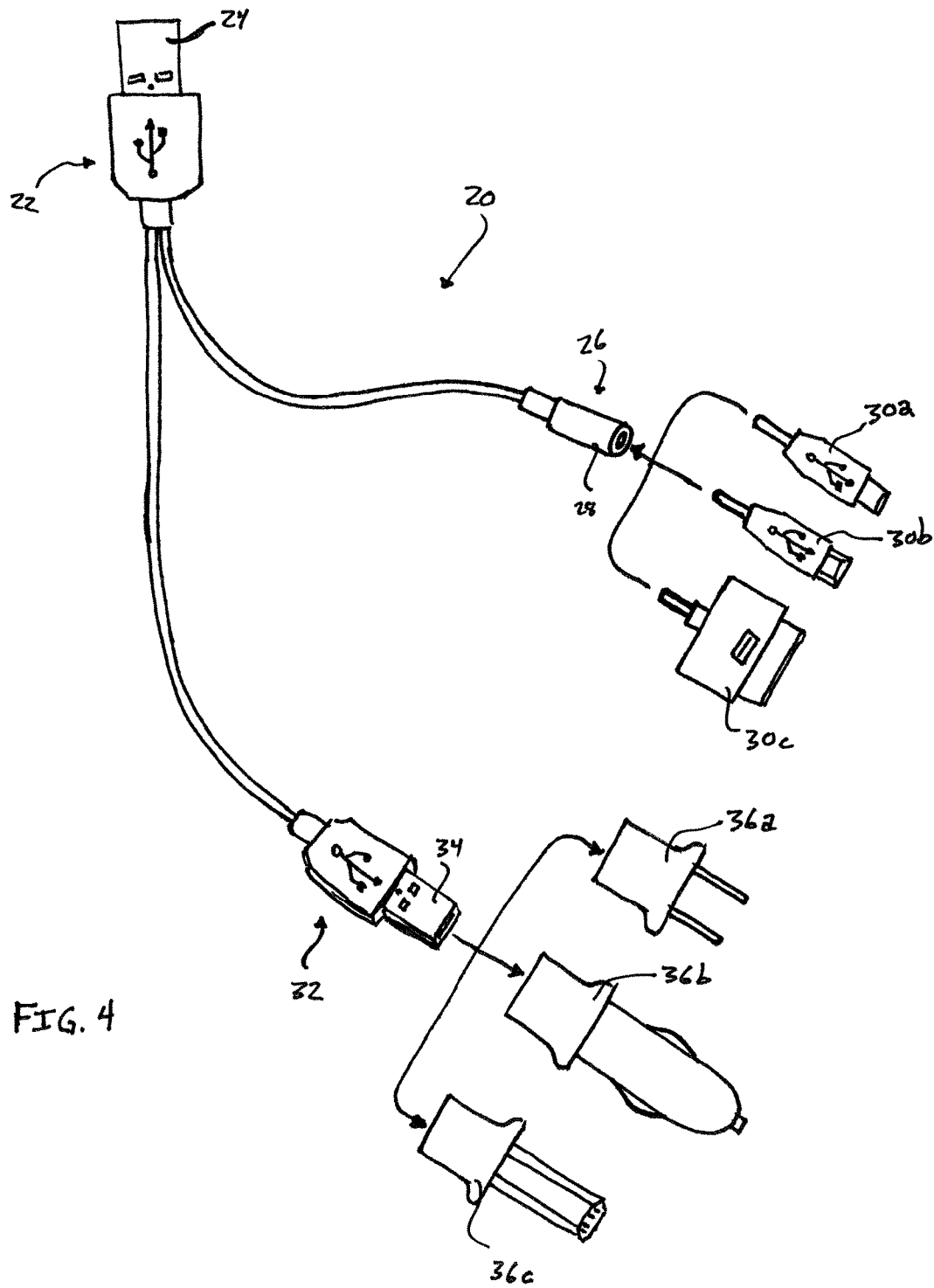
FIG. 4 illustrates an embodiment of a connector cable that may be used with the portable charger unit of FIG. 1.

The charger unit 10 of the present invention, and its two-way charging interface, as described herein, may be used with any conventional connector cable design that can connect the charger unit 10 with an external power source and/or at least one electronic device. Referring to FIG. 4, the connector cable 20 comprises multiple interfaces for interconnecting multiple devices. For example, the cable 20 includes the first end 22, which is designed for connection with the power connection port 14 of the charger unit 10. As shown, the first end 22 includes a USB interface 24 for engagement with a common USB port, such as shown on the charger unit 10 in FIG. 2. The cable 20 also includes a free second end 26 designated for connection with an electronic device (such as smart phone 60 shown in FIG. 1). As shown in FIG. 4, the free second end 26 comprises a coaxial interface 28 designed for receiving adapter pieces 30a, 30b and 30c, each having a different interface designed for connection with various electronic devices. For example, the first adapter piece 30a shown in FIG. 4 comprises a micro-USB interface, the second adapter piece 30b comprises a mini-USB interface, and the third adapter piece 30c comprises a 30-pin interface. As further shown, a free third end 32 of the connector cable 20 comprises a USB interface 34 for connection with an external power source (such as computer 50 shown in FIG. 1), or alternatively, with another electronic device while the free second end 26 is already connected with an electronic device.

Referring again to FIG. 1, the power connection port 14 is also used to recharge the internal battery unit 16. For example, as discussed above, the connector cable 20 includes the free third end 32 having a connection interface adapted to connect to an external power source. As shown in FIGS. 1 and 4, the connector cable 20 includes a USB interface 34 that can be connected with the USB port of a computer 50 to recharge the internal battery unit 16 of the charger unit 10. To recharge the internal battery unit 16 from an external power source, the connector cable 20 is connected with the external power source (via USB interface 34 on the free third end 32 of the connector cable 20) and also with the power connection port 14 (via USB interface 24 on the first end 22 of the connector cable 20). The USB interface 34 of the connector cable 20 may also be combined with various adapter pieces, such as shown in FIG. 4, or with an adapter unit, such as shown and described in co-pending U.S. patent application Ser. No. 13/571,992, incorporated herein by reference, for connecting the charger unit 10 to a variety of external power sources, such as a wall socket, a car charger socket, an airplane charger socket, and the like.

As shown in FIG. 2, the charger housing 12 includes only a single power connection port 14 that operates as a two-way charging interface. As a result, the power connection port 14 must operate as both a power input and a power output during operation of the charger unit 10. In accordance with the present invention, the internal battery unit 16 of the charger 10 can be recharged and electronic devices connected with the charger 10 can be recharged, all from the same power connection port. Though only shown with a single connection port 14, the present invention can be used with additional portable power chargers that have additional input ports, output ports, or two-way connection ports, such as described herein.

In accordance with the present invention, the charger unit 10 is readily portable as a result of the small size of the housing 20. Since operation of the charger 10 in accordance with the present invention only requires a single power connection port 14, the size of the charger housing 12 can be reduced without compromising intended operation. Additionally, there is more flexibility with the design of the size and shape of the charger housing 12, which can make the portable charger kit more commercially appealing. Despite the small size of the unit, the power capacity is very high so that the charger 10 can accommodate multiple electronic devices at the same time.

Referring to FIG. 3, the charger unit 10 comprises a rechargeable battery unit 16 disposed within the charger housing 12. In preferred embodiments, the rechargeable battery unit 16 is preferably a Lithium-Ion battery that can be recharged by connecting the charger unit 10 to an external power source, such as a computer, a wall socket, a car or an airplane power supply, using a power connecter attached to the power connection port 14 of the charger unit 10. For example, the power connector can be a cable, such as the connector cable 20 having a USB interface 24 on the first end 22 for insertion into the power connection port 14 of the charger unit 10 and a standard USB interface 34 on the free third end 32 for insertion into a USB port of a computer 50. Alternatively, the USB interface 34 of the cable 20 can be inserted into various adapter pieces or an adapter unit, as mentioned above, for connection to a standard power source, such as a wall-socket via a standard U.S. plug 36a or a variety of foreign plug styles, a car charger socket—e.g., a cigarette lighter socket—via a car charger interface 36b, or an airplane charger socket via an airplane charger interface 36c.

The rechargeable battery unit 16 is disposed within the charger housing 12 and is operatively connected with the power connection port 14 for recharging the battery 16 when the charger unit 10 is connected to an external power source via the power connection port 14. That is, an electrical charge can come into the charger 10 via the port 14 and sent to the internal battery unit 16 for recharging. In this regard, the power connection port 14 acts as a power input.

The rechargeable battery unit 16 is also operatively connected with the power connection port 14 for recharging electronic devices connected to the charger unit 10 via the power connection port 14 from the rechargeable battery unit 16. That is, an electrical charge can be sent from the battery unit 16 to electronic devices connected to the charger 10 via the port 14. In this regard, the power connection port 14 acts as a power output.

Alternatively, the charger 10 can act as a conduit through which a electrical charge can be sent directly from an external power source, such as a wall socket, a car charger socket, an airplane charger socket, or even a computer, to an electronic device connected to the charger 10 via the connector cable 20 at the same power connection port 14 to which the external power source is connected. In this situation, the power charge can bypass the internal battery unit 16. In preferred embodiments of the present invention, a charge provided from an external power source is sent to the internal battery unit 16 from the power connection port 14 and also sent directly to electronic devices for recharging via the connector cable 20. As a result, the electrical charge from an external power source can be used to recharge the internal battery unit 16 when the charger unit 10 is connected to such an external power source via the connector cable 20 and, at the same time, be sent via the connector cable 20 to electronic devices attached to the cable 20 for recharging such devices. Additionally, in accordance with the present invention, the charger unit 10 can be disconnected from the external power source—e.g., when the internal battery unit 16 of the charger 10 is fully charged—and continue to recharge any electronic devices still connected to the charger 10 via the power connection port 14. For example, the electrical charge being supplied to the electronic devices switches from being supplied by the external power source to being supplied by the internal battery unit 16 of the charger 10, as necessary.

Figure 5:
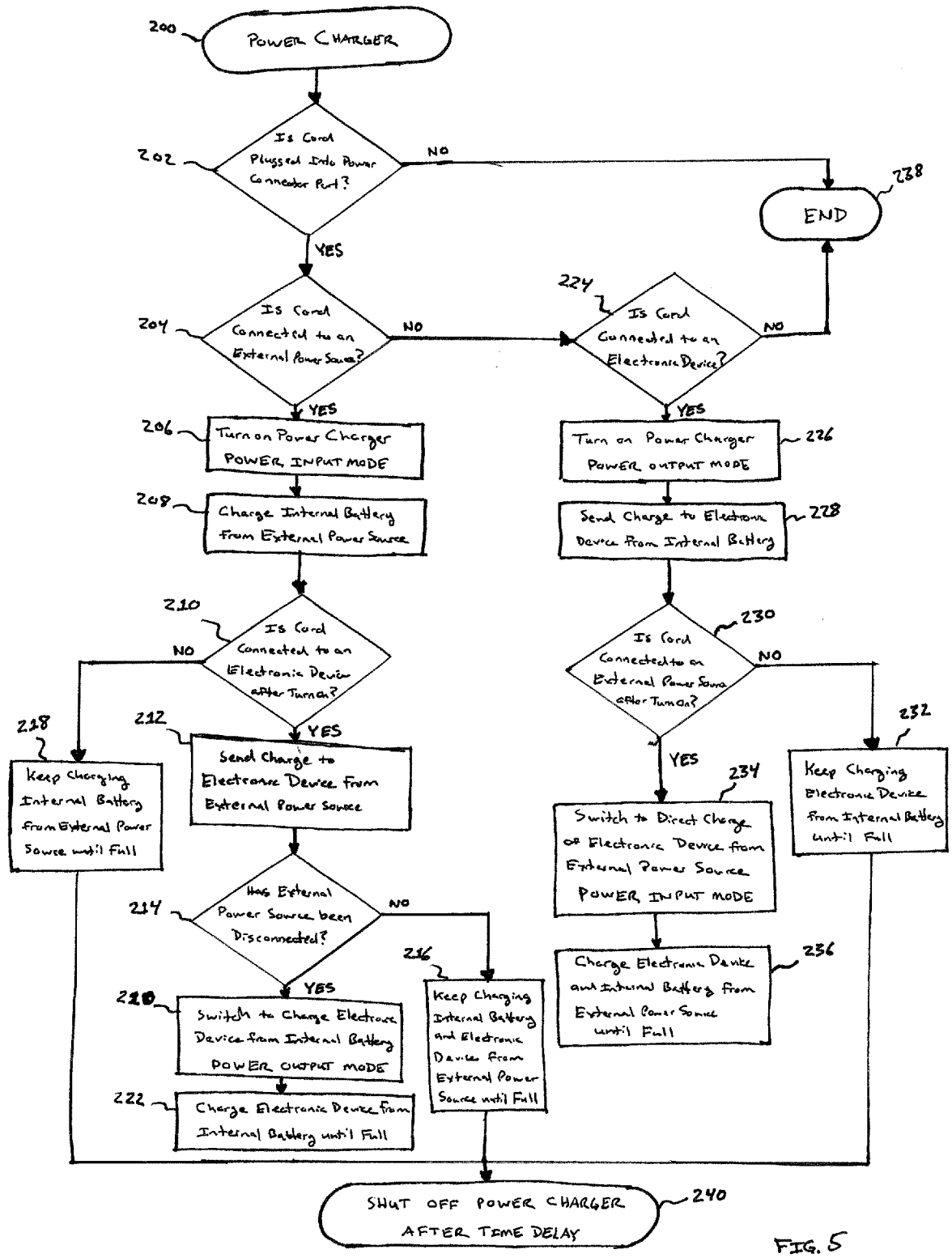
FIG. 5 shows a flowchart illustrating the operation of the portable power charger unit of FIG. 1 when connected to an external power source and/or at least one electronic device via the connector cable.

Referring to FIG. 5, operation of the charger unit 10 in accordance with the present invention, and more particularly, operation of the power connection port 14 as a power input and a power output, is illustrated. As noted, the single power connection port 14 can be used as both a power input and a power output. That is, when the power connection port 14 is connected to an external power source via a cable (such as connector cable 20), the connection port 14 acts as a power input wherein an electrical charge supplied from the external power source is sent to the internal battery unit 16 of the charger 10. When the power connection port 14 is connected to one or more electronic devices via a cable (such as connector cable 20), the connection port 14 can act as a power output wherein an electrical charge is sent to the electronic devices from the internal battery unit 16 of the charger 10. In some situations, the charger 10 can be connected to an external power source and one or more electronic devices at the same time. In such situations, the internal battery unit 16 of the charger 10 can be recharged at the same time as electronic devices connected to the charger 10 are being recharged. How the electrical charge is directed to and through a power charger 10 provided at Block 200 preferably depends on when something is connected to the power connection port 14.

In preferred embodiments of the present invention, the internal logic of the charger 10, generally designated as reference numeral 40 in FIG. 3, is designed to recognize what is connected to the power connection port 14 and coordinate operation of the port accordingly. As illustrated in FIG. 3, the charger unit 10 comprises a controller, including a processing unit 42, configured to execute instructions and to carry out operations associated with the charger unit 10 in accordance with the internal logic 40. For example, the processing unit 42 can keep track of the capacity level of the battery unit 16, store data or provide a conduit means by which data can be exchanged between electronic devices, such as between a smart phone and a computer. The processing unit 42 also determines how an electrical charge should be directed within the charger 10—for example, from the power connection port 14 to the battery unit 16 for recharging, or from the battery unit 16 to the power connection port 14 for delivery to an electronic device connected via the connector cable 20.

As shown in FIG. 4, the connector cable includes three connection ends—the first end 22 is designed for connection with the power connection port 14 of the charger 10, the second end 26 is designed for connection with an electronic device 60, and the third end 32 is designed for connection with an external power source 50. In operation of the charger 10, the internal logic 40 of the charger 10 first determines at Block 202 of FIG. 5 if the first end 22 of the connector cable 20 is inserted into the power connection port 14. If the connector cable 20 is connected, at Block 204, the charger 10 determines if the connector cable 20 is also connected to an external power source 50—i.e., an electrical charge is being sent to the power connection port 14. If the connector cable 20 is connected to an external power source 50, then the power connection port 14 is in Power Input Mode, as designated in Block 206 of FIG. 5, and the charger 10 turns on. The internal battery unit 16 will continue to charge until full and then the charger unit 10 will preferably shut off, more preferably automatically, for example, after a predesignated time delay, as shown in Blocks 208 and 240.

Continuing in FIG. 5, if after the power connection port 14 is placed in Power Input Mode, the connector cable 20 is connected to an electronic device 60 (such as queried at Block 210), an electrical charge will be sent from the external power source 50 to the electronic device 60 via the connector cable 20 at Block 212. Preferably, the charge will be routed at the power connection port 14 without affecting recharging of the internal battery unit 16. If the external power source 50 remains connected with the charger unit 10, the charger unit 10 will shut off after both the internal battery unit 16 of the charger unit 10 and the internal battery of the electronic device 60 are fully charged (Blocks 214 and 216), again, preferably automatically, for example, after a predesignated time delay, as shown in Block 240.

If after being placed in Power Input Mode, no electronic device 60 is connected to the charger unit 10, then the internal battery unit 16 of the charger unit 10 will continue to recharge from the external power source 50 until full (Block 218), after which, the charger unit 10 will shut off, preferably automatically, for example, after a predesignated time delay (Block 240).

If, after the power connection port 14 is placed in Power Input Mode and the connector cable 20 has been connected to an electronic device 60, the connector cable 20 is then disconnected from the external power source 50, such as queried at Block 214, the charger unit 10 will switch the power connection port 14 into Power Output Mode and continue to provide an electrical charge to the electronic device 60 from the internal battery unit 16 via the connector cable 20 (Blocks 220 and 222). The charge will be provided until the electronic device 60 is fully charged, after which point, the charger unit 10 will preferably shut off, more preferably automatically, for example, after a predesignated time delay, as shown in Block 240.

Referring back to Block 204 of FIG. 5, if the connector cable 20 is not connected to an external power source 50, but is connected to an electronic device 60, such as queried at Block 224, then the power connection port 14 is in Power Output Mode, as designated in Block 226 of FIG. 5, and the charger 10 turns on and sends an electrical charge to the electronic device 60 from the internal battery unit 16 via the connector cable 20 (Block 228). The internal battery unit 16 will continue to charge the electronic device 60 until full and then the charger unit 10 will preferably shut off, more preferably automatically, for example, after a predesignated time delay, as shown in Blocks 230, 232 and 240.

If after the power connection port 14 is placed in Power Output Mode, the connector cable 20 is connected to an external power source 50 (Blocks 230 and 234), the charger unit 10 will switch to Power Input Mode and direct an electrical charge received from the external power source 50 to the electronic device 60 via the connector cable 20 at Block 236. An electrical charge received from the external power source 50 will also be directed through the power connection port 14 to the internal battery unit 16 for recharging. Preferably, the charge will be rerouted at the power connection port 14 without affecting recharging of the internal battery unit 16. The charger unit 10 will shut off after both the internal battery unit 16 of the charger unit 10 and the internal battery of the electronic device 60 are fully charged, again, preferably automatically, for example, after a predesignated time delay, as shown in Block 240.

In alternative embodiments of the charger 10, if the charger 10 is connected to an electronic device 60 and in Power Output Mode and thereafter connected to an external power source 50, the charger 10 will wait until the electronic device 60 is fully charged before switching to Power Input Mode to recharge the internal battery unit 16.

If the charger 20 determines that a cable is connected to the power connection port 14 but that the cable is not connected to either an external power source 50 or any electronic device 60, then the charger 10 remains off (Block 238) until the cable is connected to something that either provides a power charge to the power connection port 14 (Blocks 204 and 206) or draws a charge from the charger 10 (Blocks 224 and 226).

Figure 6:
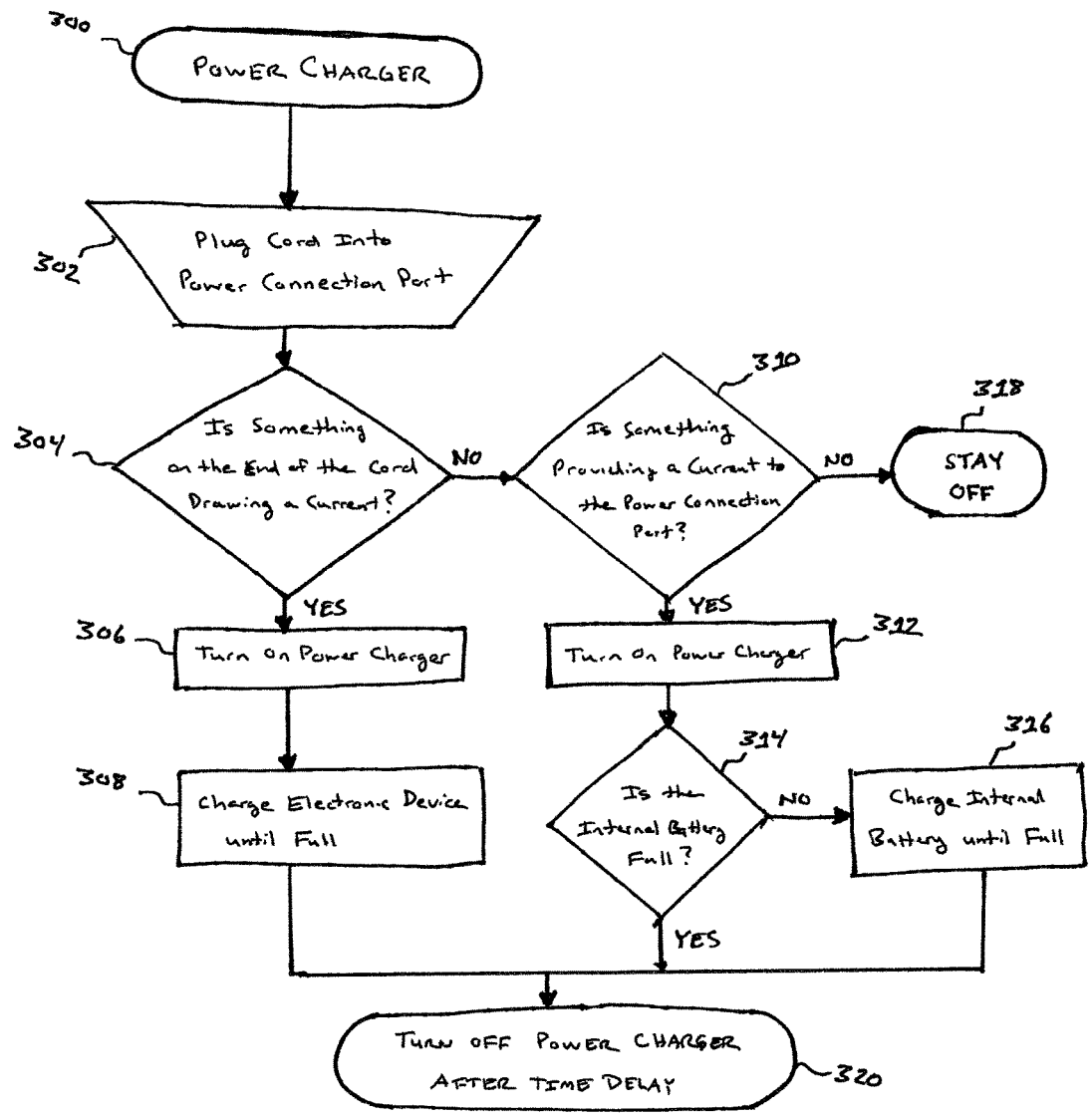
FIG. 6 shows a flowchart illustrating another aspect of the operation of the portable power charger unit of FIG. 1.

Referring to FIG. 6, the charger unit 10 of the present invention can also include operational logic, as controlled by the processing unit 42 and internal logic 40, that automatically turns the charger 10 on and off for operation. In preferred embodiments, the charger unit 10 turns on when an electronic device 60 needing charging is connected with the charger 10 via the power connection port 14. As illustrated in FIG. 3, the charger unit 10 includes an internal switch 44 disposed within the charger housing 12. In a preferred embodiment, the switch 44 actuates to an "on" position when an electronic device 60 is connected to the charger unit 10 via the power connection port 14.

More particularly, the charger unit 10 (provided in Block 300) determines first if a cable (such as connector cable 20) is plugged into the power connection port 14. Referring to FIG. 6, the activation process begins at Block 302 when something is plugged in to the power connection port 14. Next, at Block 304, the charger 10 determines if there is something on the other end of the connector cable 20 drawing current from the charger 10. For example, if an electronic device 60 is connected at the free second end 26 of the connector cable 20, then the power charger 10 turns on (Block 306). As shown in FIG. 5, in this situation, the charger unit 10 may be in Power Output Mode. The charger 10 will operate to recharge the electronic device 60 from the internal battery unit 16 via the connector cable 20 until the internal battery of the electronic device 60 is fully charged (Block 308).

If there is no electronic device 60 on the end of the connector cable 20 drawing current from the power charger 10, the charger 10 will then determine at Block 310 if there is something providing current to the charger 10—namely, an external power source 50, such as a wall socket, a car charger socket, an airplane charger socket, or a computer. For example, if the connector cable 20 is connected to a wall socket via an adapter piece 36a at the third free end 32 of the connector cable 20, then the power charger 10 turns on (Block 312) so that the internal rechargeable battery 16 can be recharged, if necessary. As shown in FIG. 5, in this situation, the charger unit 10 will turn on in Power Input Mode. The charger 10 will first determine if the internal battery unit 16 is full (Block 314), and if not, the charger 10 will recharge until the internal battery unit 16 is at full capacity (Block 316).

If a cable is connected to the power connection port 14 but there is nothing connected at the other end of the cable—either an electronic device 60 to be charged or an external power source 50 that provides a current—then the charger 10 remains in a deactivated condition (Block 318).

Once the internal battery 16 of the charger unit 10 and the battery of any electronic device 60 connected to the charger unit 10 is fully charged, then the charger unit 10 will shut off, preferably automatically, and more preferably after a predesignated time delay, such as indicated at Block 320 of FIG. 6.

In alternate embodiments of the present invention, the charger unit 10 may include "shake-to-activate" technology, whereby the unit 10 is turned on by shaking the charger housing 12. In such embodiments, the switch 44 actuates to an "on" position by a quick force—such as the force created by a shake of the charger 10.

In further alternate embodiments, the charger unit 10 can include a manual on/off button or switch 38 operatively connected with the internal switch 44 for activating and deactivating the unit 10 as desired, for example, if the user doesn't wish to wait for any predesignated time delay to turn off the charger 10 or until the internal battery unit 16 is fully charged. Additionally, the manual on/off button 38 can be used to activate the charger 10 even when nothing is connected to the power connection port 14—for example, to check to see what the remaining charge is on the internal battery unit 16 before connecting an electronic device 60 to the charger 10 for recharging.

The processing unit 42 also preferably includes a timer for automatically turning the charger unit 10 off if there is no device attached to the unit 10 for a predetermined period of time, or if the internal battery unit 16 of the charger 10 is fully charged, or if any electronic device 60 attached to the charger unit 10 is fully charged. In this regard, the capacity of the battery 16 can be preserved. Preferably, there is a time delay before the charger 10 shuts down—for example, once an action is complete, such as the internal battery unit 16 is fully charged, the timer will begin a predesignated time delay, after which the charger 10 will turn off and the battery unit 16 will be deactivated. In the case where the charger 10 is being recharged from an external power source 50 and recharging electronic devices 60 at the same time, the charger 10 will wait until all relevant batteries are fully charged before beginning the time delay for shut off. As noted above, a manual on/off switch 38 can be provided, and a user can manually shut off the charger 10 at any time as desired.

Referring to FIG. 2, the charger housing 12 also includes a power indicator means 46 that indicates the remaining capacity of the internal battery 16 in the charger unit 10. For example, in an embodiment of the present invention illustrated in FIG. 2, the power indicator means 46 comprises a series of lights, but can include more or fewer lights without departing from the principles and spirit of the present invention. The processing unit 42 communicates with the battery unit 16 to determine how much capacity is remaining in the battery 16. Upon determining the capacity level, the processing unit 42 communicates with the power indicator means 46 to provide the user with the appropriate signal for showing how much capacity is remaining in the internal rechargeable battery unit 16. When the battery 16 is at full capacity (F), all the lights will be lit up. As the battery power decreases, the lights will correspondingly decrease by one as the power is used. If there is no capacity left in the internal battery unit 16 (E), none of the lights will be lit up. Alternatively, the power indicator means 46 can comprise a digital interface that provides a battery capacity level for the internal rechargeable battery unit 16, or another known means of providing battery level information.

The power indicator means 46 can also confirm that the internal switch 44 has been turned "on" by lighting up. As shown in FIG. 3, the switch 44 is operatively connected to the rechargeable battery unit 16 and the power indicator means 46 via the processing unit 42. Once the switch 44 is closed to turn on the charger 10, the power indicator means 46 will provide an indication that the charger 10 is operating.

Upon shut down of the charger unit 10, the power indicator means 46 will preferably indicate that the charger 10 is being turned off—for example, the lights will provide a sequential blinking signal. This signal is useful when the charger 10 is automatically shutting off after the relevant batteries have been fully charged and a predesignated time delay has elapsed, as discussed above.

The charger housing 12 may include additional indicator means providing additional information for separate functions of the charger unit 10. For example, separate indicator means can be provided to indicate that an electrical current is being supplied to one or more electronic devices connected to the charger unit 10. Alternatively, a second power indicator means can be provided to indicate that the charger 10 is on or off, especially useful in embodiments of the present invention utilizing an automatic activation/deactivation logic that don't require a manual power button. Still further, an indicator means can be provided to indicate whether the charger is in a Power Input Mode or a Power Output Mode.

The charger housing 12 encloses various electrical components (such as integrated circuit chips and other circuitry) to provide computing operations for the device. The integrated circuitry and other components may comprise a power supply (e.g., the internal rechargeable battery), a microprocessor and controller (e.g., a CPU), memory (e.g., ROM, RAM, flash), a circuit board, a hard drive, and/or various input/output (I/O) support circuitry. The electrical components may also include components for sending and receiving data and media (e.g., antenna, receiver, transmitter, transceiver, etc.).

The processing unit 42 further includes a storage unit 48 that provides a place to hold data or instructions for operation of the charger unit 10 and rechargeable battery unit 16, or data exchanged between the charger unit 10, a computer, and electronic devices connected to the charger unit 10, or memory needed for further operations of the charger unit 10.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A method for using a portable power charger having a rechargeable internal battery and a processing unit each operatively connected to a power connection port, said method comprising:

determining, using the processing unit, if a connector cable is connected to the power connection port; and, if so determining, using the processing unit, if the connector cable is also connected to at least one of (i) an external power source supplying an electrical charge through the connector cable, and (ii) an electronic device attempting to draw an electrical charge through the connector cable; and, if so turning on the power charger;

placing the power charger in a power output mode, whereby an electrical charge is provided from the internal battery of the power charger to recharge an internal battery of an electronic device, in case a free end of the connector cable is connected to at least one electronic device having an internal battery; or placing the power charger in a power input mode, whereby an electrical charge is provided to the internal battery of the power charger from the external power source to recharge the internal battery of the power charger, in case a free end of the connector cable is connected to an external power source; or placing the power charger in the power input mode, in case free ends of the connector cable are connected to the external power source and to the at least one electronic device, and subsequently, switching the power charger from the power input mode to the power output mode, whereby electrical charge is provided from the internal battery of the power charger to the internal battery of the electronic device, in case the power charger is disconnected from the external power source but still connected to the at least one electronic device.

2. The method according to claim 1, further comprising the step of:

shutting off the power charging if the internal battery of the power charger is fully charged and if the internal battery of any electronic device connected to the power charger via the connector cable is fully charged.

3. The method according to claim 1, further comprising the steps of:

determining, using the processing unit, if any electronic device is still connected to the connector cable;

confirming if the internal battery of the power charger is fully charged, and if the internal battery of any electronic device still connected to the connector cable is fully charged; and, if so shutting off the power charger after a time delay.

4. The method according to claim 1, further comprising the step of:

switching the power charger from the power output mode to the power input mode if, after the power charger is already connected to the at least one electronic device to provide an electrical charge to the at least one electronic device from the internal battery of the power charger, the power charger is connected to the external power source to supply an electrical charge to the power charger from the external power source.

5. The method according to claim 4, further comprising the step of:

in the power input mode, charging the at least one electronic device from the external power source via the power charger.

6. The method according to claim 1, further comprising the step of:

switching the power charger from the power input mode to the power output mode, in case (i) the power charger is connected to the external power source and to the at least one electronic device and (ii) the internal battery of the power charger is fully charged and (iii) the internal battery of the at least one electronic device is not fully charged.

* * * * *